Oct. 30, 1951     A. H. LAMB     2,573,205
SURFACE TEMPERATURE THERMOMETER
Filed May 8, 1947     2 SHEETS—SHEET 1
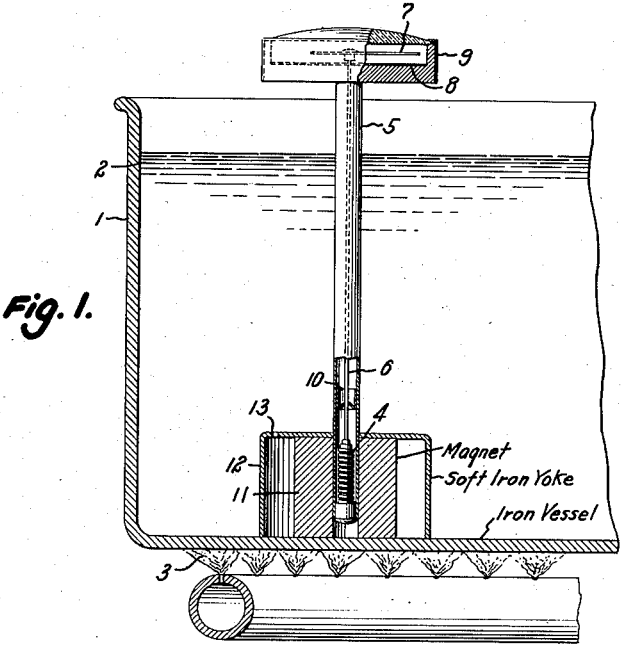
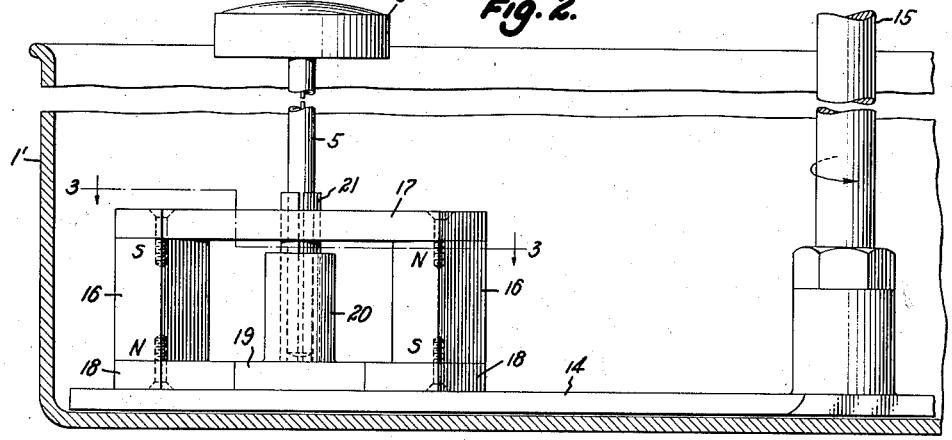
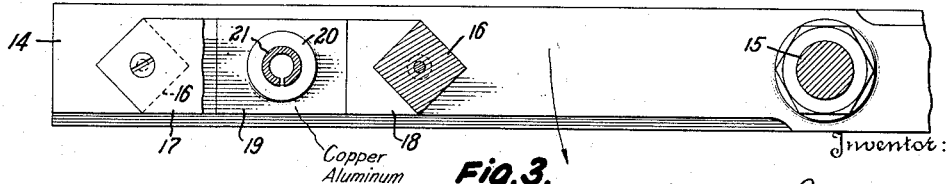
Inventor:
Anthony H. Lamb,
By
Pierce, Scheffler & Parker,
Attorneys.

Oct. 30, 1951  A. H. LAMB  2,573,205
SURFACE TEMPERATURE THERMOMETER
Filed May 8, 1947  2 SHEETS—SHEET 2

Inventor:
Anthony H. Lamb,
By Pierce, Scheffler & Parker,
Attorneys.

Patented Oct. 30, 1951

2,573,205

UNITED STATES PATENT OFFICE 2,573,205

SURFACE TEMPERATURE THERMOMETER

Anthony H. Lamb, Hillside, N. J., assignor to Weston Electrical Instrument Corporation, Newark, N. J., a corporation of New Jersey Application May 8, 1947, Serial No. 746,675

1 Claim. (Cl. 73—343)

This invention relates to surface temperature thermometers, i. e. to thermometers for measuring the temperature of surfaces such as, for example, the exterior surfaces of gas conduits or steam pipes, the interior surfaces of externally heated vessels in which food products or other materials are being processed, and the "parting" surfaces of metal molds for the casting of metal articles or the hot pressing of plastic materials.

The invention is particularly useful in the measurement of rapidly changing temperatures under shop and factory conditions which preclude the use of the electrical types of temperature measuring apparatus. In a metal foundry, for example, the working conditions are decidedly unfavorable to the use of the electrical apparatus which is quite satisfactory in the hands of a skilled operator in the quiet of a laboratory. Sprays of water are employed to cool the molds, and the electrical equipment would be damaged by water and steam. The parting compound should be applied within a relatively limited temperature range, for example after the mold surface is cooled below 400° F. but before the temperature drops below 212° F. The industry has sought a practical surface temperature thermometer for over a quarter of a century, but the current practice is still to judge the surface temperature of the mold by the manner in which water sputters and boils on the mold surface. Small thermometers which may be quickly applied to and removed from the mold surface increase the efficiency of the foundry by a greater total output and a decrease in the number of defective castings.

The invention is also useful under conditions which do not require a removal of the thermometer as soon as a critical surface temperature is measured. The processing of foods and chemicals in externally heated vessels can be carried out expeditiously and without danger of overheating if adequate means is provided for continuously measuring the temperature of the heated surface in contact with the food or chemical, but there has been no satisfactory solution for this problem in thermometry.

Objects of the present invention are to provide surface temperature thermometers of a mechanical type which are of simple and rugged construction adapted for use in shops and factories. Objects are to provide surface temperature thermometers of the bimetallic metal type in which the thermometer element is a bimetallic helix, or plurality of bimetallic helices, of short length housed in the end of a hollow stem of small diameter, and the stem end is fitted into the bore of a metal contact plate having an end surface complementary to the surface under temperature investigation. Further objects are to provide surface temperature thermometers of the character stated in which the metal contact plate is a permanent magnet, or has a permanent magnet secured thereto, for temporarily holding the contact plates in engagement with the surface of a ferrous metal pipe, vessel or other apparatus.

These and other objects and the advantages of the invention will be apparent from the following specification when taken with the accompanying drawings in which:

Fig. 1 is a fragmentary vertical section through an iron vessel in which is installed a surface temperature thermometer embodying the invention;

Fig. 2 is a similar fragmentary vertical section through a vessel provided with a rotary iron or steel stirrer upon which is mounted a surface temperature thermometer embodying the invention;

Fig. 3 is a fragmentary plan view of the stirrer and the mounting for the thermometer element of the Fig. 2 apparatus, with parts in section as taken on line 3—3 of Fig. 2;

Figure 4:
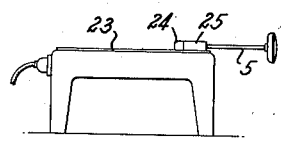
Fig. 4 is a side elevation of an electrically-heated hot plate with a thermometer thereon which is another embodiment of the invention.
Figure 5:
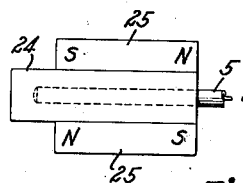
Fig. 5 is a plan view, on an enlarged scale of the surface temperature thermometer of Fig. 4.
Figure 6:
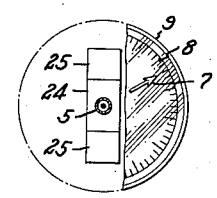
Fig. 6 is a fragmentary end elevation of the same.

In Fig. 1 of the drawings, the reference numeral 1 identifies an iron vessel in which a liquid 2 is heated by a gas flame 3 beneath the bottom of the vessel. A thermometer for measuring the temperature of the interior surface of the bottom wall comprises a bimetallic helix 4, or plurality of coaxial helices, within the end of an elongated hollow stem 5. The ends of the bimetallic element are anchored respectively to the stem 5 and to a staff 6 which carries a pointer 7 for displacement along a graduated scale plate 8 within a casing 9 to which the stem is secured. The staff 6 is loosely guided by one or more bearings 10 which are mounted within the elongated stem 5. The thermometer element per se may be, and preferably is, of known commercial construction in which high accuracy and a quick response to changing temperatures are obtained through the use of relatively light bimetallic helices within hollow stems having an outside diameter from ⅛ inch to ½ inch.

The lower end of stem 5 has a snug sliding fit within the bore of a permanent magnet 11 of high coercive force, for example a magnet of "Alnico V," which has a lower end surface for seating upon the bottom of the vessel 1. A yoke 12 of soft iron extends across the upper end of the magnet 11 and has a downwardly turned flange which contacts the vessel 1 to complete a metallic path for the magnetic flux. When the yoke 12 is of inverted cup shape, as shown, one or more openings 13 are provided in the top wall of the yoke for the escape of steam from the zone between the magnet 11 and the yoke 12.

The magnet 11 assumes the temperature of the vessel wall and acts as a thermal well to transfer the temperature of the vessel wall to the bimetallic helix 4 of the thermometer element. The magnet is of sufficient strength to afford a substantially rigid support for the bimetallic thermometer. The thermometer stem 5 does not have a binding fit with the bore of the magnet, and the thermometer may be turned into the position which is most convenient for observation of the pointer and scale.

In the apparatus of Figs. 2 and 3, the vessel 1' is provided with a stirrer blade 14 on the end of a rotary shaft 15, and the surface temperature thermometer assembly is magnetically attached to the stirrer blade. The magnetic system includes two permanent magnets 16 which are joined at their upper ends by a soft iron bar 17 and which have lower pole pieces 18 of soft iron which are bridged by a plate 19 of high heat conductivity, for example of copper or aluminum. A cylindrical extension 20 of the plate 19 has a bore for receiving the stem 5 of a bimetallic thermometer. As illustrated, a longitudinally split tubular sleeve or adapter 21 is snugly fitted into the bore of the cylinder 20, and the thermometer stem 5 is snugly fitted into the split sleeve 21. The adapter 21 may be removed for temperature measurements in another range by a thermometer having a stem of larger diameter to fit within the bore of the cylindrical heat well 20. The material being processed may be liquid, a mixture of liquids and solids, or a granular solid material; and the magnetic system is designed for sufficient strength to retain the assembly in place during rotation of the stirrer. When the processing apparatus is such that the stirrer is rotated at a relatively high speed, the temperature reading may be made by stroboscopic light.

For the measurement of the temperatures of exposed surfaces, such as the surfaces of molds or of an electrically heated hot plate 23, as shown in Fig. 4, the metal contact plate 24 with an axial bore for receiving the stem 5 of a bimetallic thermometer may be a rectangular plate or bar of high heat conductivity having bar-shaped permanent magnets 25 secured to its opposite sides by welding or brazing. The bar magnets 25 are reversely arranged as to polarity, as indicated by the polarity symbols, and the adjacent exposed surfaces of the thermal contact bar 24 and the bar magnets 25 aline or merge into each other to form smooth unbroken surfaces at the opposite faces of the assembly for full surface contact with the object whose surface temperature is to be measured. The surface temperature thermometers may be applied to the mold surfaces as soon as the castings are removed, since the thermometer casings 9 are hermetically sealed and the movement is not damaged by the streams of cooling water. One or more surface temperature thermometers are applied to the parting surface of each mold section, and all of the thermometers may be so oriented as to be read from a single point by one workman. The workman may change position at will from time to time since there is nothing critical in the location and orientation of the thermoseters on the molds. The lag between the surface temperatures and the temperature readings is of the order of only a few seconds when the bimetallic thermometer stems 5 are ⅛ inch in diameter and the contact plates 24 are copper or aluminum strips about ¼ inch thick.

Figure 7:
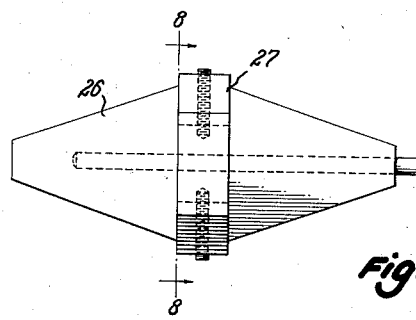
Fig. 7 is a plan view of another embodiment of the invention.
Figure 8:
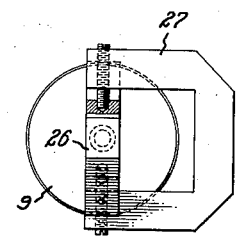
Fig. 8 is an end elevation, partly in section on line 8—8 of Fig. 7, of the thermometer well or contact plate of Fig. 7.

Another embodiment of the invention, as illustrated in Figs. 7 and 8, includes a double tapered plate 26 of high heat conductivity having a bore in which the stem 5 of a bimetallic thermometer is fitted. The opposite edges of the plate 26 are notched to receive the ends of the legs of a permanent magnet 27 of U-shape which provides a convenient handle for the assembly.

Figure 9:
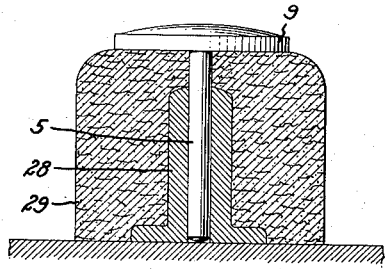
Fig. 9 is a substantially vertical section through another embodiment of the invention.
Figure 10:
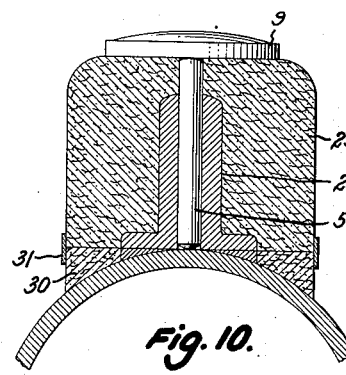
Fig. 10 is a side elevation, with parts in central vertical section, of the Fig. 9 apparatus with a surface-engaging adapter secured thereto.

Other embodiments of the invention, is illustrated in Figs. 9 and 10, include a metal contact mass or heat well 28 having a bore for receiving the stem 5 of a bimetallic thermometer, and heat insulating material 29 surrounding the heat well 28 and the portion of the stem 5 which extends above the heat well. The heat insulating mass has the dual function of preventing a temperature drop along the stem which would result in a false temperature reading and of maintaining the exterior surface of the assembly relatively cool to permit manual removal and replacement of the temperature measuring assembly.

The lower surface of the heat well 28 is plane for seating upon a plane surface, and an adapter 30 with an outer surface complementary to the surface under investigation may be attached to the apparatus of Fig. 9 by a band 31 which may be of adhesive material or a clamp similar to a conventional hose clamp.

The illustrated embodiments of the invention indicate that there is wide latitude in the shape and construction of the contact plates or heat wells of the surface temperature thermometers, and it will be apparent that other veriations which may occur to those skilled in the art fall within the spirit and scope of the invention as set forth in the following claim.

I claim:

A surface temperature thermometer comprising a rectangular bar of non-magnetic metal of high heat conductivity having a surface thereof shaped for contact engagement with the surface of an object of ferrous metal whose temperature is to be measured, said body having an axial bore therein, a bimetallic thermometer element having a stem seated in said bore, and a pair of bar-shaped permanent magnets secured to and along opposite sides of said rectangular bar of non-magnetic metal and parallel to said bore for holding said shaped surface of the bar of non-magnetic metal in engagement with an object of ferrous metal; said magnets being reversely arranged as to polarity and the adjacent exposed surfaces of said magnets and said bar of non-magnetic material being alined to form smooth unbroken surfaces for contact with an object whose surface temperature is to be measured.

ANTHONY H. LAMB.

REFERENCES CITED

The following references are of record in the file of this patent:

UNITED STATES PATENTS

| Number | Name | Date |
|---|---|---|
| 1,220,635 | Hunter et al. | Mar. 27, 1917 |
| 1,892,165 | Rudolph | Dec. 27, 1932 |
| 2,162,614 | Fry et al. | June 13, 1939 |
| 2,265,733 | Jones | Dec. 9, 1941 |
| 2,293,276 | Brown et al. | Aug. 18, 1942 |
| 2,417,860 | Cline | Mar. 25, 1947 |

FOREIGN PATENTS

| Number | Country | Date |
|---|---|---|
| 550,678 | Great Britain | Jan. 19, 1943 |